Feb. 28, 1950 E. M. HAZEL 2,498,854

POCKET PARLIAMENTARY LAW INDICATOR

Filed April 29, 1946 2 Sheets-Sheet 1

INVENTOR

Edwin M. Hazel

Victor J. Evans & Co.

ATTORNEYS

Feb. 28, 1950 E. M. HAZEL 2,498,854

POCKET PARLIAMENTARY LAW INDICATOR

Filed April 29, 1946 2 Sheets-Sheet 2

INVENTOR

Edwin M. Hazel

Victor J. Evans & Co

ATTORNEYS

Patented Feb. 28, 1950

2,498,854

UNITED STATES PATENT OFFICE 2,498,854

POCKET PARLIAMENTARY LAW INDICATOR

Edwin M. Hazel, Chicago, Ill.

Application April 29, 1946, Serial No. 665,854

1 Claim. (Cl. 35—21)

The invention relates to an indicator device, and more especially to a pocket parliamentary law indicator or decisionator.

The primary object of the invention is the provision of a device of this character, wherein ordinary deliberative assemblies and conventions acclaimed by many prominent parliamentarians require their rules of order, motions and proceedings, debates, business procedure and other activities applied and decisioned before chairmen, presidents, officers, parliamentarians, rank-and-filers and teachers, presiding over meetings, organizations, assemblies or the like, without reference of a book of manuals, arbitration, delays, but with dispatch and accuracy and in this regard the said device accomplishes correct decisions at a glance thereof.

Another object of the invention is the provision of a device of this character, wherein it can be conveniently carried in the pocket or purse of a user, thus being handy for instant service and is readily and easily manipulated with ease and dispatch, for reference at a glance for answers to parliamentary questions, for smoothness in procedure of meetings, and other gatherings.

A further object of the invention is the provision of a device of this character, which is simple in construction, thoroughly reliable and efficient in operation, quickly adjusted, it possessing maximum wearing qualities and durability, neat in appearance made up of few parts, convenient for the carrying thereof in the pocket of a user, without requiring excessive space and inexpensive to manufacture.

With these and other objects in view the invention consists of the features of construction, combination and arrangement of parts as will be hereinafter more fully described, illustrated in the accompanying drawings which disclose the preferred embodiment of the invention as pointed out in the claim hereunto appended.

In the accompanying drawings.

Similar reference characters indicate corresponding parts throughout the several views in the drawings.

Figure 1:
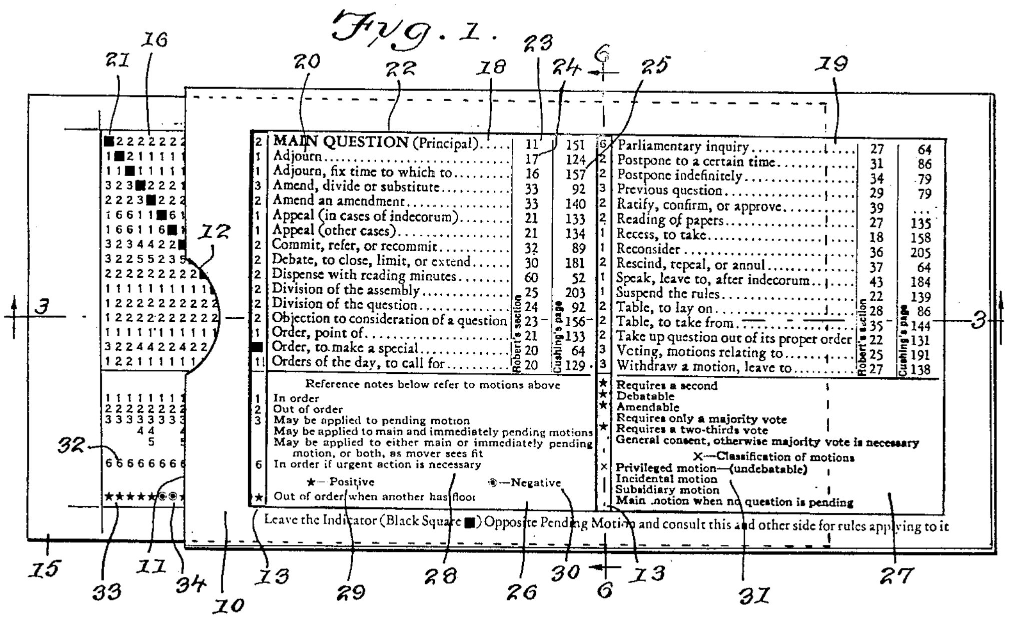
Figure 1 is a plan view of the device constructed in accordance with the invention.
Figures 2, 3:
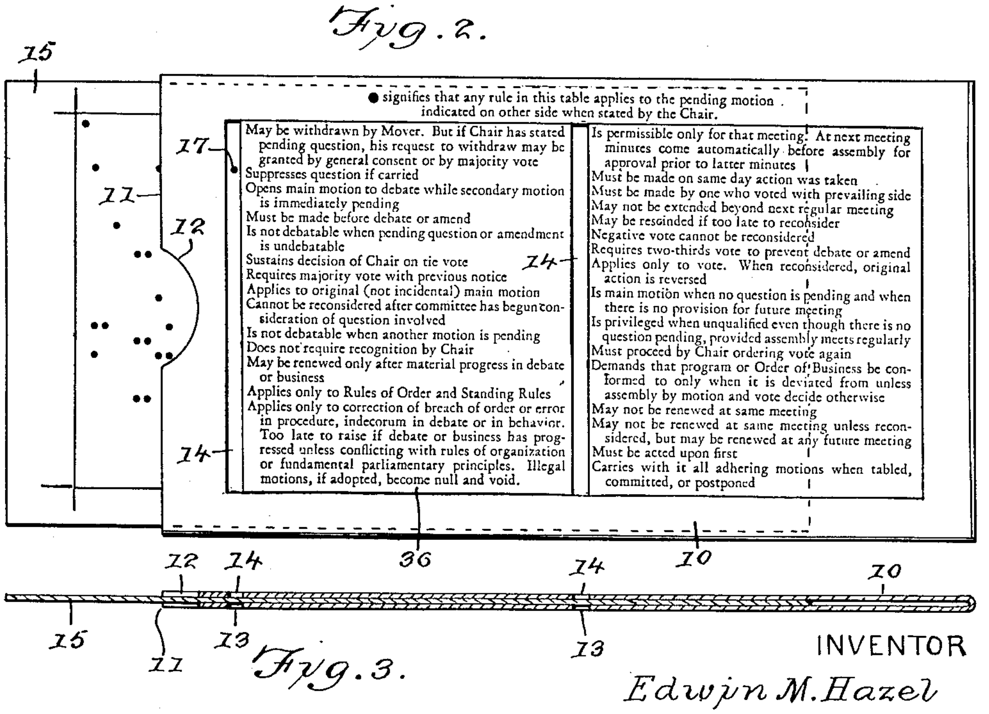
Figure 2 is a view similar to Figure 1 looking toward the opposite side thereof.
Figure 3 is a central longitudinal cross section view taken through Figure 1.
Figures 4, 6:
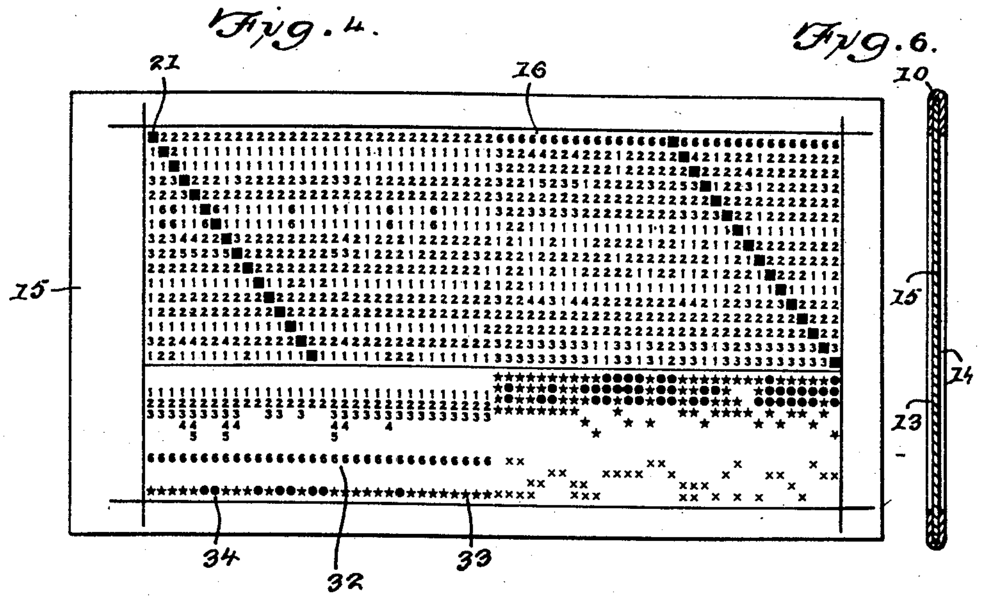
Figure 4 is a plan view of the slide removed from the cover casing.
Figure 6 is a central transverse cross sectional view taken through Figure 1.
Figure 5:
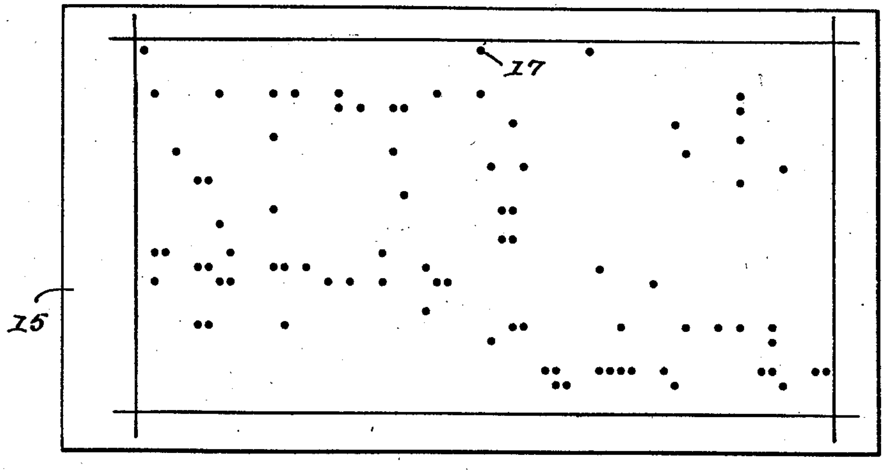
Figure 5 is a view similar to Figure 4, looking toward the opposite face of the slide.

Referring to the drawings in detail, the device constituting the present invention comprises an outer envelope like body 10 forming a housing or casing of elongated or substantially rectangular shape and of any selected size, it being preferably of a size that will fit into a garment pocket or purse and is preferably made from stiff sheet-like material, as for example, card-board paper material. This body 10 is permanently closed along its opposite longer top and bottom edges, and one end edge, while the opposite end edge forms an entrance mouth generally denoted at 11 in association with matching finger receiving notches 12 as provided in confronting side faces or areas of the said housing or casing.

The opposite or confronting side faces or areas of the body 10 have formed therein spaced columnar slots 13 and 14 respectively, which in their pairs in each face or area are arranged parallel with each other in a vertical direction crosswise of the elongated or rectangular formation of such face or area, and the pair of slots in one of the latter align and coincide or register with the pair of slots in the other face or area throughout the extent thereof.

The slots 13 in one face or area of the body 10 are visibility windows for numerical indicia of a tabulation present on one face of an indicator slide 15 which is movably fitted within such body 10 and accessible at the entrance mouth 11 for manual adjustment of such slide, while the slots 14 in the other face or area of the body 10 are visibility windows for dot indicia of a tabulation present on the other face of such slide 15. The numerical indicia is generally denoted at 16, and the dot indicia at 17 respectively.

Printed or otherwise indicated in framed ruled spaces 18 and 19 respectively on the face having the slots 13 and to the right-hand side of the latter are columnar rows of horizontally lined grouped question phrases as at 20 of parliamentary significance for decision and ruling. These phrases 20 cooperate with the numerical indicia 16 which at determined digit points thereof appear black squares 21 for identifying a particular phrase 20 of the group, on adjustment of the slide 15 for decision and answered as hereinafter described. The group of phrases 20 at the left hand area of the body 10 is captioned by "Main Question" (principal) as at 22, and to the right of the phrases 20 and aligned therewith in vertical columnar spaces 23 are numerical section references and page references 24 and 25 respectively of edited parliamentary authorities as for example: "Robert's" and "Cushing's" for rulings in connection with a particular phrase 20 question decisioned thereby.

Immediately below the spaces 18 and 19 are framed ruled spaces 26 and 27, respectively one being headed by the caption, "Reference notes below refer to motions above," followed by columnar rows of horizontally lined reference notations 28 including "positive and negative" markings 29 and 30 respectively and classification "*x*" marking 31, the reference notations 28 being cooperative with numeral indicia 32, the markings 29 and 30 with similar markings 33 and 34, and the marking 31 with similar marking 35 appearing on the slide 15 and visible through the windows 13 on adjustment of the said slide for rulings and order of procedure.

The slots 14 in the other face or side of the body 10 make visible the dot indicia 17 therethrough for coaction with columnar horizontally lined grouped answer phrases 36 of parliamentary significance and decisioned, which indicia 17 is disposed at selected or determined points in the tabulation, so that when the slide is adjusted through cooperation of a black square 21 with a question phrase 20 under identification by the former, a particular indicia 17 will identify a phrase 36 for a definite ruling answer thereto.

As an explanation of the use of the device, move the slide card until the indicator (black square) appears in one of the boxes or windows opposite the pending motion, or motion as stated by the chairman. Heavy figures in the windows appear above or below the black square opposite immediately pending motions refer to the reference notes (see below). Then leave the indicator there to ascertain whether or not any other motion or motions (see alphabetical list of motions on the right side of each window) may be applied to the said pending motion (1). Look at the signs below for positive—black star (*) and for negative (Not)—circled dot (.) and find out if it is in order to offer a motion when another member has the floor. (2) If it requires a second to consider the motion. (3) If it is debatable. (4) If it is amendable. (5) If it requires only a majority vote, a two-thirds vote, or general consent for its disposal. (6) Consult the reference notes below for rules referring to motions above. (7) Consult other side where dots (.) appear in the windows opposite the rules applying to the pending motion or immediately pending motions. (8) Light figures in the right columns refer to sections in Robert's Rules of Order and to pages in Cushing's Manual.

For example: After a main question is made, seconded and stated by the chairman, it may be debated, and may be set aside temporarily by yielding to subsidiary motions, incidental motions or privileged motions. If a motion to lay the main motion on the table is made, move the slide card again until the indicator (black square) appears opposite the motion "table, lay on." Consult the reference notes below and on other side. The different actions are explained by the rules shown by the dots (.) on reverse side. You will find that it is positively out of order to lay the main motion on the table when another member has the floor; that it requires a second to lay on the table; that it is negatively (Not) debatable; that it is Not amendable, and so on. If the motion to lay on the table is made, seconded, and stated by the chairman, it becomes an immediately pending motion which must be voted upon first; if carried, the main motion with or without amendments is laid aside temporarily or until it is taken from the table by a majority vote. If lost, the main motion is still before the house for its consideration.

It will be understood that modifications may be made in the arrangement of the parts and particularly in reference words or marks without departing from the spirit of the invention.

What is claimed is:

In a device of the character described, the combination of a substantially rectangular first side sheet and a second side sheet folded back and coextensive with the same, means securing the free longitudinal edges of said sheets together to form an envelope, a substantially rectangular slide slidably supported by and between said sheets, said slide being adapted to be manually adjusted relative to said sheets, said first sheet having a pair of spaced substantially rectangular slots extending perpendicularly to the longitudinal axis of said sheet, one of said slots being intermediate the ends of the sheet and the other of said slots being adjacent an end of said sheet, said second sheet having a pair of rectangular slots aligned with the rectangular slots, respectively, of said first sheet, said slots forming windows for exposing selected portions of said slide, said first sheet between its parallel slots and between one of said slots and an end of said sheet containing lines of question phrases pertaining to parliamentary motions, said lines being parallel to the longitudinal axis of said first sheet, said second sheet between its parallel slots and between one of said slots and an end of said second sheet containing lines of phrases of parliamentary significance in answer to the question phrases on said first sheet, said lines being parallel to the longitudinal axis of said second sheet, said slide having on the obverse side thereof a series of columns of aligned indicia parallelly arranged relative to said slots, the indicia of each column including an index mark whereby said slide can be adjusted in said envelope to expose a column of indicia through a slot of said first sheet and to align an index mark of the exposed column with a question phrase line on said first sheet, said slide in its reverse side having a series of columns of aligned indicia, each said column adapted to be selectively exposed through the window slot of said second sheet, the last-mentioned indicia being aligned with predetermined lines on said second sheet, whereby said latter lines will be the answer to the question phrase on the first sheet aligned with the index mark.

EDWIN M. HAZEL.

REFERENCES CITED

The following references are of record in the file of this patent:

UNITED STATES PATENTS

| Number | Name | Date |
|---|---|---|
| 509,891 | Gore | Dec. 5, 1893 |
| 788,790 | Merrill | Dec. 27, 1904 |
| 1,166,675 | Griffin | Jan. 4, 1916 |
| 1,360,726 | Crook | Nov. 30, 1920 |
| 1,686,843 | Burke | Oct. 9, 1928 |
| 2,385,452 | Lande | Sept. 25, 1945 |